(12) United States Patent
Dulberg et al.

(10) Patent No.: US 7,409,318 B2
(45) Date of Patent: Aug. 5, 2008

(54) SUPPORT NETWORK

(75) Inventors: Adi Dulberg, Brookline, MA (US);
Eldad Maniv, Cambridge, MA (US);
Gil Levonai, Winchester, MA (US);
Oren Minzer, Cambridge, MA (US);
Ronny Elkayam, Tel-Aviv (IL)

(73) Assignee: Nextnine Ltd., Tel-Aviv (IL)

( * ) Notice: Subject to any disclaimer, the term of this patent is extended or adjusted under 35 U.S.C. 154(b) by 0 days.

(21) Appl. No.: 11/376,521

(22) Filed: Mar. 15, 2006

(65) Prior Publication Data

US 2006/0161394 A1 Jul. 20, 2006

Related U.S. Application Data

(60) Division of application No. 10/203,865, filed as application No. PCT/IL01/00144 on Feb. 14, 2001, now Pat. No. 7,076,400, and a continuation-in-part of application No. 09/654,925, filed on Sep. 5, 2000, now abandoned.

(60) Provisional application No. 60/264,729, filed on Jan. 30, 2001, provisional application No. 60/264,730, filed on Jan. 30, 2001, provisional application No. 60/182,211, filed on Feb. 14, 2000.

(51) Int. Cl.
*G06F 3/02* (2006.01)
(52) U.S. Cl. .................. 702/184; 702/182; 702/185; 702/188
(58) Field of Classification Search .............. 702/119, 702/182–185, 189, 188; 703/27; 705/8; 709/203, 223; 714/4
See application file for complete search history.

(56) References Cited

U.S. PATENT DOCUMENTS 5,265,254 A 11/1993 Blasciak et al. ............. 717/130

(Continued)

*Primary Examiner*—Patrick Assouad
*Assistant Examiner*—Felix Suarez

(57) ABSTRACT

A method of device maintenance, comprising:
  providing a maintenance network including a user site and a multi-device servicing site that provides maintenance to at least one target device in said user site;
  selecting, by a user, a degree of access of maintenance functions of said servicing site to at least one of maintenance-related information of said target device and commanding said target device to perform a maintenance-related task; and
  setting said degree of access.

48 Claims, 3 Drawing Sheets

U.S. PATENT DOCUMENTS

| | | | |
|---|---|---|---|
| 5,450,586 A | 9/1995 | Kuzara et al. | 717/124 |
| 5,594,904 A | 1/1997 | Linnermark et al. | 717/124 |
| 5,682,328 A | 10/1997 | Roeber et al. | 702/187 |
| 5,805,891 A * | 9/1998 | Bizuneh et al. | 717/121 |
| 5,815,653 A | 9/1998 | You et al. | 714/38 |
| 5,819,093 A | 10/1998 | Davidson et al. | 717/126 |
| 5,884,082 A | 3/1999 | Seidel et al. | 717/128 |
| 5,909,581 A | 6/1999 | Park | 717/170 |
| 5,961,594 A * | 10/1999 | Bouvier et al. | 709/223 |
| 6,006,034 A | 12/1999 | Heath et al. | 717/170 |
| 6,009,274 A | 12/1999 | Fletcher et al. | 717/173 |
| 6,029,175 A | 2/2000 | Chow et al. | 707/104.1 |
| 6,067,639 A | 5/2000 | Rodrigues et al. | 714/38 |
| 6,085,029 A | 7/2000 | Kolawa et al. | 714/38 |
| 6,094,729 A | 7/2000 | Mann | 714/25 |
| 6,106,571 A | 8/2000 | Maxwell | 717/131 |
| 6,106,573 A | 8/2000 | Mahalingaiah et al. | 717/128 |
| 6,126,328 A | 10/2000 | Mallory et al. | 717/114 |
| 6,128,652 A | 10/2000 | Toh et al. | 709/219 |
| 6,151,643 A | 11/2000 | Cheng et al. | 710/36 |
| 6,158,045 A | 12/2000 | You | 717/124 |
| 6,161,200 A | 12/2000 | Rees et al. | 714/38 |
| 6,167,538 A | 12/2000 | Neufeld et al. | 714/47 |
| 6,167,567 A | 12/2000 | Chiles et al. | 717/173 |
| 6,173,421 B1 | 1/2001 | Weaver Johnson et al. | 714/38 |
| 6,189,142 B1 | 2/2001 | Johnston et al. | 717/125 |
| 6,202,199 B1 | 3/2001 | Wygodny et al. | 717/125 |
| 6,230,194 B1 | 5/2001 | Frailong et al. | 709/220 |
| 6,243,774 B1 | 6/2001 | Eide et al. | 710/302 |
| 6,249,907 B1 | 6/2001 | Carter et al. | 717/129 |
| 6,253,368 B1 | 6/2001 | Nelin et al. | 717/125 |
| 6,282,701 B1 | 8/2001 | Wygodny et al. | 717/125 |
| 6,321,338 B1 * | 11/2001 | Porras et al. | 726/25 |
| 6,357,017 B1 | 3/2002 | Bereiter et al. | 714/27 |
| 6,421,777 B1 * | 7/2002 | Pierre-Louis et al. | 713/2 |
| 6,681,383 B1 * | 1/2004 | Pastor et al. | 717/126 |
| 6,839,717 B1 * | 1/2005 | Motoyama et al. | 707/104.1 |
| 2001/0005852 A1 | 6/2001 | Bogle et al. | |
| 2004/0138938 A1 * | 7/2004 | Quintus et al. | 705/8 |

\* cited by examiner

SUPPORT NETWORK

RELATED APPLICATIONS

This application is a divisional of U.S. application Ser. No. 10/203,865 filed on Dec. 12, 2003, now U.S. Pat. No. 7,076,400 issued on Jul. 11, 2006, which is a U.S. national filing of PCT Application No. PCT/IL01/00144, filed Feb. 14, 2001, which claims the benefit under 35 USC 119(e) of U.S. provisional patent application 60/182,211, filed on Feb. 14, 2000 and U.S. provisional applications Nos. 60/264,729 and 60/264,730, filed on Jan. 30, 2001. This application is also a continuation-in-part of U.S. patent application 09/654,925, filed on Sep. 5, 2000 now abandoned. This application is also related to PCT Application No. PCT/IL01/00142, filed on Feb. 14, 2001, which designates the US. The disclosures of all of these applications are incorporated herein by reference.

FIELD OF THE INVENTION

The present invention relates to the field of automated support, especially for electrical appliances.

BACKGROUND

When a device, e.g., an electrical appliance, fails or appears to fail, the operator of the appliance typically requires "support" from qualified technical personnel. Several types of support are typically used today:

(a) the operator carries the device to a service station (or sends it by mail);

(b) a service technician arrives to check the device;

(c) The operator contacts a hot line (or reads a manual) for receiving telephone (or e-mail) instructions for diagnosing and/or repairing the device;

(d) the operator contacts a service center (manual or automated) via the Internet; and (e) for software "devices", a remote login program, such as PCAnywhere can be used to allow service personnel to log into the computer on which the software is executing.

Network management, for example, automatically monitoring which devices are active and which devices are faulty, is known. However, such management does not include servicing the faulty devices.

As technology progresses, more manufactured devices include embedded controllers that execute embedded software. Such devices typically use complex algorithms and do not include moving parts and/or clear displays for simple diagnosis by a lay-person.

SUMMARY OF THE INVENTION

In accordance with some exemplary embodiments of the invention, an automated maintenance network is provided, for remotely maintaining software embedded devices and/or guiding operators in their maintenance of the devices. Optionally, the maintenance network is hierarchical and/or includes components that specialize in particular maintenance problems and/or devices.

As used herein, the term "maintaining" refers to support activities that relate to failure states, for example, including the prevention, avoidance, diagnosis and/or solution of failure states in a device. A failure may be caused by internal and/or external agents, for example, due to wearing out or failure of components, incorrect design, use outside of design specifications, bad input of data or instructions and/or malicious activity.

An aspect of some embodiments of the invention relates to an automated, and optionally centralized maintenance server. In an exemplary embodiment of the invention, the automated maintenance server performs one or more maintenance related tasks automatically. Alternatively or additionally, one or more tasks are performed semi-automatically, for example, requiring user approval for some activities (e.g., especially non-reversible ones), using human resources to perform activities on a device and/or passing difficult situations to a human for analysis and/or solution.

In an exemplary embodiment of the invention, however, the management of the tasks associated with a failure state is performed automatically and optionally at a location remote from the device and/or outside of the device itself.

In an exemplary embodiment of the invention, the automatic server performs, for example, one or more of:

(a) send commands and/or scripts to the embedded controller to perform diagnosis activities;

(b) send commands and/or scripts to repair software and/or hardware problems and/or to configure the device;

(c) send commands and/or scripts to test susceptibility of the device to various actions;

(d) send commands and/or scripts to perform periodic or sporadic preventive maintenance activities;

(e) copy device setup, software and/or patches, between two or more devices; send commands and/or scripts to test susceptibility of the device to various actions;

(f) apply cross-testing between devices, for example to detect possible failure modes by comparing the responses of different devices to a same or similar test; and (g) gather, collate and/or compare operational statistics, failure statistics and/or cause-effect patterns within or between devices.

Optionally, one or more of the above tasks is performed by a site server that is located near the maintained device, for example connected by a LAN to the device. Alternatively or additionally, the task are performed by a dedicated agent embedded in the device or associated with the device.

Optionally, the management function is separate from the data storage and/or the maintenance performance functions. For example, the management function can include one or more of:

(a) monitoring that a maintenance process is being carried out according to plan;

(b) taking note of the effect of a maintenance task;

(c) selecting among different possibilities (e.g., automatic decision making);

(d) modifying a maintenance process;

(e) distributing work between components for the maintenance process (e.g., data analysis may be performed by another component, with only the results used for management of the process);

(f) setting parameters for a maintenance task;

(g) time management (e.g., making sure maintenance is happening within a required time schedule and/or re-scheduling, skipping and/or adding steps);

(h) trading off between the usage of resources by multiple maintenance processes; and/or (i) ensuring that various maintenance-related goals (e.g., down-time, failure rate and/or cost) are met or approximated.

In an exemplary embodiment of the invention, a communication protocol between the server(s) and the device(s) uses a standardized format, so that a plurality of devices, configurations, device makes, device versions and/or device manufactures can be supported by a small number of maintenance servers.

An aspect of some embodiments of the invention relates to a maintenance method in which a device to be maintained actively seeks its maintenance, optionally seeking management of maintenance activities by an external servicing server. In an exemplary embodiment of the invention, the active seeking can be limited to checking if the external servicing server has any maintenance related request and/or data. Alternatively or additionally, active seeking includes one or more of the device requesting assistance, the device requesting bids on maintenance and/or the device sending out a data package for analysis at the maintenance provider. Optionally, the device includes one or more timers or event alerts that are used by the device to determine if periodic maintenance is required. Optionally, one or more of these activities are performed by a component associated with the device, for example, a site server. In some embodiments of the invention, the device (or an associated agent or site server) cannot know for sure that maintenance is required, for example, in case of externally timed periodic maintenance or when the an occurrence of a failure event is determined by remote analysis of data exported by the device.

In an exemplary embodiment of the invention, a publication agent is provided in association with the embedded device, for providing data from the device to a servicing server. In some exemplary embodiments of the invention, the publication agent selects the data to be uploaded to the server. In an exemplary embodiment of the invention, such a publication agent allows a device to communicate with the server in an off-line connection, rather than using an on-line connection. Alternatively or additionally, fewer connections between server and device are required than without such a publication agent. Alternatively or additionally, there is less interference with the operation and/or timing of the embedded controller. In an exemplary embodiment of the invention, one or more pre-defined data profiles are provided. Different such profiles may be associated with different failure events and data based on the profile sent when a failure is detected. Alternatively or additionally, a user or the device or a site server can request transmission of such a predefined data set.

In an exemplary embodiment of the invention, a communications server is provided to allow components that are within a firewall to interact with components outside the firewall (and possibly in a different firewall). In one example, the components connect to the communication server using an unblocked protocol, for example HTTP. In an exemplary embodiment of the invention, the connections are used to poll and/or to write to mail boxes, associated with other components of the network. Alternatively, the mail boxes may be located at the servicing server.

In an exemplary embodiment of the invention, the data and/or problem complaints of a device are exported by the device, for remote analysis. Possibly, such exporting reduces the amount of communication overhead, the number of live connections and/or enhances privacy and/or security of the devices and/or the device operators.

In an exemplary embodiment of the invention, the data for a device is exported only once from the site of the device, as a complete data set, rather than as a series of responses to request for data. However, a complete data set is exported, including, for example a complete log and/or a plurality of device state vectors. This may allow interactive data acquisition to be avoided or reduced. Alternatively or additionally, the device behavior is analyzed at the server, using the data as an input to a model of the device.

An aspect of some embodiments of the invention relates to automated log analysis, as an aid to maintenance of a device. Such maintenance may be local or may be remote. In an exemplary embodiment of the invention, the log includes internal devices states, for example recorded by hooks in the device. Optionally, analysis includes detecting a pattern of states and/or state changes or durations that indicate an upcoming failure state. In an exemplary embodiment of the invention, the automated analysis includes comparing logs of different devices. Alternatively or additionally, new data is acquired for one or more devices, for comparison to earlier acquired data and/or model data. Alternatively or additionally, the log of a device is analyzed to detect possible reasons for failure. Alternatively or additionally, the analysis is for detecting decline (and potential future failure).

In an exemplary embodiment of the invention, log analysis includes comparing multi-variable logs from the same or different devices, across normal and faulty states. Optionally, the analysis includes detecting near-faults (e.g., suspiciously high CPU usage) which can indicate imminent faults (e.g., missing a response time limit to an event). In an exemplary embodiment of the invention, patterns of faults, near faults and tracked variable patterns are used for diagnosis or predicting fault situations by pattern matching.

In an exemplary embodiment of the invention, the devices are periodically polled. When the polling shows suspicious data, a logging is initiated and/or enhanced (e.g., by changing the parameters logged and/or the logging resolution). Alternatively, the devices (or a local site server) may view the logs and/or the polled data to determine if logging should be enhanced.

The log may be organized and/or accessible in various ways, for example as data fields (e.g., each representing a tracked variable), as events (e.g., to which a response includes a change in logging) and/or as state vectors (e.g., set of parameters that describe the state of the device being logged). The contents of the log (e.g., which data is logged and/or which events recorded) may be decided a priori and/or may be set by the events that occur and/or by the maintenance server. The log may include, for example, state vectors prior to a failure, during a repair process and after a repair process. The data for the log may be, for example, periodically acquired, acquired when it changes and/or more densely acquired before, during and/or after important events. In an exemplary embodiment of the invention, data is acquired at a high quality and some of the data is averaged or discarded when it is determined that no noteworthy event occurred and/or as memory fills up.

The log may be provided to the server in real-time and/or after the fact, for example, at a delay, periodically and/or as a function of the size of the unsent log.

An aspect of some embodiments of the invention relates to user controlled privacy in a servicing network. In an exemplary embodiment of the invention, a user can set the degree of access, of other parts of the servicing network, to data and/or instructions of the devices associated with the user. Optionally, the user sets the privacy level via a site server associated with a site at which the device is located.

In an exemplary embodiment of the invention, the device seeks maintenance and the maintenance process is managed by an external entity. However, actual application of some of the maintenance-related tasks and/or analysis if the results is performed by a site server, with only the results being provided to the remote manager. Thus, sensitive data can remain at the user site.

An aspect of some embodiments of the invention relates to updating real-time software on the fly. In an exemplary embodiment of the invention, executing software is patched, for example by replacing one or more instructions, functions or data elements of the software. In an exemplary embodiment of the invention, the updating is performed at a time when it is expected that the software will not be executing the particular updated code.

In an exemplary embodiment of the invention, an agent determines, before patching, that a patched location is not going to be in use for a while and/or that patching will not affect currently running tasks in an undesirable manner (e.g., causing a contradiction). In an exemplary embodiment of the invention, such determination is made based on execution patterns of the device, for example, that after calling a function "A", a function "B" is usually called only after a few seconds, so function "B" can be patched. Determination that a function is called may be achieved, for example, by hooks in the function or by activating a time based interrupt. Such execution patterns may be determined, for example, by analyzing logs from the same or from other devices. Alternatively or additionally, the effect of changing the code is estimated based on the effect of such a change in other executing devices, with similar state vectors (e.g., sets of parameter values). Alternatively or additionally, the code is changed when the state vector is similar to or the same as a vector at which it is known that such a change in code has no adverse effect and/or has a desired beneficial effect. It is noted that the experience from other devices can be used to estimate (e.g., by the server or agent) not only when to make changes in code, but also possible long term effects of such changes.

In an exemplary embodiment of the invention, the code that is updated is the code of one of the maintenance related agents and/or watchdogs and not the operational code of the software. Alternatively or additionally, patches to the operational software may be made.

An aspect of some embodiments of the invention relates to learning, by a maintenance server and/or one of the agents, parameters of a new supported device. Such parameters being learnt may include, for example, the operational properties of such a device and/or typical failure modes. In an exemplary embodiment of the invention, at least some rules describing the expected failure modes of such a device are provided by the manufacturer and/or by a human technician, during at least some of the servicing sessions for the device. In an exemplary embodiment of the invention, the failures and/or behavior of a plurality of similar devices are used by the server to learn faster what to expect from the new device. Possibly, such learning also includes classification of device properties and/or configuration parameters that affect the failure modes, for example, for a refrigerator, the location relative to inside or outside walls.

An aspect of some embodiments of the invention relates to generating a fault specific display for a maintenance viewer. In an exemplary embodiment of the invention, data that is received from a device is analyzed, for example using a set of data analysis rules or other equivalent means, to determine which parts of the data are of interest. Interest can include, for example, the data indicating the fault, being affected by the fault or causing (or indicating the cause) the fault. In an exemplary embodiment of the invention, a display to a user is generated to focus on the interesting information, for example graphing the information or by modifying the relative resolution, screen space and/or accessibility afforded different parts of said data. Optionally, additional data is acquired to supplement said display. Optionally, the display is selected from a set of predefined display formats. Alternatively, an ad-hoc format is generated, for example, a graph that shows variations in value of a device parameter over time.

There is thus provided in accordance with an exemplary embodiment of the invention, a method of device maintenance, comprising:

determining that maintenance should be performed on a target device;

automatically selecting a maintenance process including at least one maintenance task to effect said maintenance;

automatically managing said maintenance process on a maintenance server separate from said target device, said maintenance server adapted to manage maintenance processes for a plurality of devices, said managing including at least monitoring the execution of said process; and automatically performing at least one said maintenance-related task to effect at least a portion of said maintenance of said target device. Optionally, automatically managing comprises automatically recording an effect of said maintenance process on said target device. Optionally, automatically managing comprises modifying said maintenance process by said maintenance server in response to said effect. Alternatively or additionally, automatically managing comprises controlling a time duration of said maintenance process by said maintenance server. Alternatively or additionally, automatically managing comprises generating a series of maintenance tasks by said maintenance server.

In an exemplary embodiment of the invention, at least two of said plurality of devices are located at a same site. Alternatively, at least two of said plurality of devices are located at different, unassociated, sites.

In an exemplary embodiment of the invention, at least part of said maintenance server is located at a same site as said target device. Alternatively, at least part of said maintenance server is located at a different site from said target device. Optionally, said maintenance server and said target device are separated by a firewall.

In an exemplary embodiment of the invention, said maintenance server comprises a centralized server. Alternatively, said maintenance server comprises a plurality of distributed components. Optionally, said plurality of distributed components is arranged in a hierarchical structure.

In an exemplary embodiment of the invention, said determining is performed by said maintenance server. Alternatively or additionally, said selecting is performed by said maintenance server. Alternatively or additionally, said performing is performed by said maintenance server.

In an exemplary embodiment of the invention, at least one of said performing, said selecting, and said determining is performed by at least two physically separated components that cooperate as a distributed system. Alternatively, each of said performing, said selecting, and said determining is performed by a non-distributed component.

In an exemplary embodiment of the invention, said determining is performed by said target device or a dedicated agent associated with said target device. Alternatively or additionally, said performing is performed by said target device or a dedicated agent associated with said target device.

In an exemplary embodiment of the invention, at least one of said determining, said selecting and said performing is performed by a site server associated with a plurality of devices located at a same site as said target device. Optionally, at least two of said determining, said selecting and said performing is performed by said site server.

In an exemplary embodiment of the invention, said performing comprises manually performing a task. Alternatively or additionally, said performing comprises automatically performing said at least one task.

In an exemplary embodiment of the invention, said selecting comprises selecting from a plurality of available maintenance processes. Alternatively or additionally, said selecting comprises tailoring a maintenance processes. Alternatively or additionally, said selecting comprises selecting in response to a previous maintenance history of said target device. Alternatively or additionally, said maintenance process comprises acquiring data from said target device and then diagnosing a fault based on said data. Alternatively or additionally, said maintenance process comprises iteratively acquiring data from said target device and analyzing said data to determine additional data useful for diagnosing said target device. Alternatively or additionally, said maintenance process comprises testing at least one potential repair method on said target device to select a desirable repair method and then applying said repair method on said target device. Alternatively or additionally, said maintenance process comprises testing at least one potential repair method on a different device from said target device to select a desirable repair method for said target device and then applying said repair method on said target device.

In an exemplary embodiment of the invention, said determining comprises analyzing a log acquired by said target device, when said target device detects a potentially problematic operational state. Optionally, said log is stored by a site server associated with a plurality of devices located at a same site as said target device, and available for use even if said target device is crashed.

In an exemplary embodiment of the invention, determining that maintenance should be performed comprises receiving an alert to a fault condition of said target device. Optionally, said alert is provided for action with a set of data associated with said alert. Optionally, said data is stored in a distributed manner.

There is also provided in accordance with an exemplary embodiment of the invention, a method of device maintenance, comprising:
determining, by a target device, that maintenance-related tasks generated specifically for the target device by a separate entity, may be available for said target device; and
seeking by said target device of the maintenance-related tasks; and
performing of said maintenance-related tasks by said target device to effect maintenance of said target device. Optionally, said seeking comprises polling a mailbox in which a maintenance provider deposits maintenance tasks. Optionally, the method comprises depositing a response to said task in said mailbox by said target device. Alternatively or additionally, the method comprises depositing device data in said mailbox by said target device. Optionally, said target device data comprises log data collected based on an task previously collected by said target device as a result of a previous seek. Alternatively or additionally, the method comprises analyzing said target device data remotely from said target device.

In an exemplary embodiment of the invention, the method comprises generating a further maintenance related task by said entity, in response to said target device data.

In an exemplary embodiment of the invention, said data is sufficient for diagnosis of said target device without retrieving additional data from said target device.

In an exemplary embodiment of the invention, said mailbox is a personal mailbox for said target device. Alternatively or additionally, said entity that generates said maintenance-related tasks comprises an automatic maintenance server. Alternatively or additionally, said seeking comprises seeking at a communication server. Alternatively or additionally, said seeking comprises seeking via a site server associated with a plurality of devices located at a same site as said target device. Alternatively or additionally, said seeking comprises seeking via a dedicated agent associated with said target device. Alternatively or additionally, said target device is protected by a firewall from said entity. Alternatively or additionally, said seeking uses a protocol that bypasses said firewall. Optionally, said protocol comprises a HTTP protocol. Alternatively or additionally, the method comprises emulating a device maintenance protocol that is normally blocked by said firewall, using said seeking. Optionally, said protocol comprises at least one of Telnet, SNMP and CMIP.

There is also provided in accordance with an exemplary embodiment of the invention, a method of device maintenance, comprising:
providing a maintenance network including a user site and a multi-device servicing site that provides maintenance to at least one target device in said user site;
selecting, by a user, a degree of access of maintenance functions of said servicing site to at least one of maintenance-related information of said target device and commanding said target device to perform a maintenance-related task; and
setting said degree of access. Optionally, said setting comprises setting at said target device. Alternatively or additionally, said setting comprises setting at a site server associated with a plurality of devices located at a same site as said target device. Alternatively or additionally, said setting comprises setting at a communication server that mediates communication between said user site and servicing site.

In an exemplary embodiment of the invention, the method comprises enforcing conformance with said degree of access by an entity associated with said user site. Optionally, said entity comprises a site server associated with a plurality of devices located at a same site as said target device.

In an exemplary embodiment of the invention, said entity comprises a dedicated agent associated with said target device.

In an exemplary embodiment of the invention, said enforcing comprises blocking data arriving from said target device. Alternatively or additionally, said enforcing comprises blocking tasks sent to said target device. Alternatively or additionally, said enforcing comprises faking device data. Alternatively or additionally, said provided maintenance comprises automated maintenance.

In an exemplary embodiment of the invention, said provided maintenance comprises manual maintenance.

In an exemplary embodiment of the invention, said maintenance network comprises an on-line network. Alternatively or additionally, said maintenance network comprises an off-line network.

In an exemplary embodiment of the invention, said degree of access comprises allowing said servicing site to view maintenance-related information from said target device. Alternatively or additionally, said degree of access comprises allowing said servicing site to set parameters in said target device. Alternatively or additionally, said degree of access comprises allowing said servicing site to access a maintenance protocol supported by said target device.

In an exemplary embodiment of the invention, said target device comprises a home appliance. Alternatively or additionally, said target device comprises a telecommunication network device. Alternatively or additionally, said target device comprises a computer network device. Alternatively or additionally, said target device comprises a computer device.

In an exemplary embodiment of the invention, said maintenance-related task comprises an instruction to patch software on said target device. Alternatively or additionally, said maintenance-related task comprises at least one diagnosis rule. Alternatively or additionally, said maintenance-related task comprises an instruction to collect information on said target device. Alternatively or additionally, said task includes a collection profile.

In an exemplary embodiment of the invention, said maintenance-related task comprises an instruction to collect information on said target device. Alternatively or additionally, said maintenance comprises preventive maintenance. Alternatively or additionally, said maintenance comprises diagnosing a fault condition. Alternatively or additionally, said maintenance comprises repairing a fault condition.

There is also provided in accordance with an exemplary embodiment of the invention, a maintenance configuration adapted for carrying out the method as described above, comprising:

at least one target device at a user site;

at least one site server associated with a plurality of devices at said user site; and a maintenance server that provides maintenance for said target device.

There is also provided in accordance with an exemplary embodiment of the invention, a method of device maintenance, comprising:

providing a log of data produced by a target device, said log including indications of internal states of said target device, said internal states comprises at least an identification of an execution location within software on said device; and analyzing said indications of internal states to detect pre-fault events that indicate a fault state of said target device.

In an exemplary embodiment of the invention, said indicated fault state comprises a current fault state. Alternatively or additionally, said indicated fault state comprises an upcoming fault state. Alternatively or additionally, said log includes values of parameters of said device. Alternatively or additionally, said indications include a profile of an execution path of said software.

In an exemplary embodiment of the invention, the method comprises filtering said log to form a meta log. Optionally, said filtering comprises identifying internal device states based on said log.

In an exemplary embodiment of the invention, said analyzing comprises comparing two logs. Optionally, said logs are from a same device, at different times. Alternatively or additionally, said logs are from different devices. Optionally, the method comprises generating operational instructions for a different device, to collect a log for said comparing. Optionally, said operational instruction comprises a fault causing instruction. Alternatively or additionally, said operational instruction comprises an instruction designed to recreate a fault situation of said target device on said different device.

There is also provided in accordance with an exemplary embodiment of the invention, a method of device maintenance, comprising:

providing a plurality of similarly configured devices at a plurality of sites belonging to unrelated users;

detecting a state in a target one of said devices, said state being unknown to an automatic maintenance server that provides maintenance for said target device; and activating a second one of said target devices to obtain data useful in at least one of diagnosing and treating said unknown state. Optionally, said unknown state comprises a fault state. Alternatively or additionally, said activating comprises activating to collect operational parameters of said target device. Alternatively or additionally, said activating comprises attempting to repeat said unknown state on said second device. Alternatively or additionally, said activating comprises attempting to avoid said unknown state on said second device. Alternatively or additionally, said activating comprises attempting to correct said unknown state on said second device.

There is also provided in accordance with an exemplary embodiment of the invention, a method of device maintenance, comprising:

providing a maintenance network including a user site and a multi-device servicing site that provides maintenance to at least one target device in said user site;

defining a set of data for a plurality of parameters of said target device;

collecting data at said device responsive to said defined set;

sending said collected data by said target device to said servicing site in response to a single event; and performing maintenance on a device, by said servicing site, responsive to said set. Optionally, said event comprises a user request for said defined set. Alternatively, said event comprises a request by a site server associated with a plurality of devices at said site. Optionally, said request is generated by said site server in response to an alert to a fault state in said target device. Optionally, said target device generates said alert.

In an exemplary embodiment of the invention, said defining comprises downloading a definition to said target device. Alternatively or additionally, said defining comprises defining at least two different sets for at least two different fault conditions.

There is also provided in accordance with an exemplary embodiment of the invention, a method of displaying device data for a maintenance viewer, comprising:

receiving target device data including values for a plurality of parameters associated with the device;

automatically analyzing said target device data, resulting in an indication of a subset of said parameters that are of interest;

generating a display in which said subset is emphasized. Optionally, analyzing comprises applying at least one analysis rule. Alternatively or additionally, the method comprises requesting said target device data from said target device in accordance with a predefined device collection profile. Alternatively or additionally, the method comprises requesting said target device data from said target device in accordance with an device collection profile defined for the display task.

In an exemplary embodiment of the invention, said subset consists of fewer than five parameters. Optionally, said subset consists of a single parameter.

In an exemplary embodiment of the invention, said subset identifies a fault condition. Alternatively or additionally, said subset identifies a cause of a fault condition. Alternatively or additionally, said subset identifies a result of a fault condition.

In an exemplary embodiment of the invention, generating comprises selecting from a plurality of predefined displays.

In an exemplary embodiment of the invention, generating comprises generating a new display format.

In an exemplary embodiment of the invention, the method comprises automatically requesting additional device data in response to said analysis, for enhancing said display.

There is also provided in accordance with an exemplary embodiment of the invention, a method of updating of executing software, comprising:

providing a target device having an executing software including a plurality of code sections between which sections execution passes;

providing a replacement code patch to said target device;

automatically estimating when a section is not executing and others sections are executing; and automatically replacing code in said not executing section with said replacement code patch. Optionally, replacing comprises replacing an entire code section. Alternatively, replacing comprises replacing a single code instruction. Alternatively or additionally, replacing comprises replacing a data section.

Optionally, replacing comprises adding a call to a function associated with maintenance of said target device.

In an exemplary embodiment of the invention, replacing comprises repairing said target device.

In an exemplary embodiment of the invention, replacing comprises replacement by operational software of said target device. Alternatively, replacing comprises replacement by a maintenance agent of said target device.

In an exemplary embodiment of the invention, the method comprises further estimating that said replacement will not affect correct execution of other sections. Alternatively or additionally, estimating comprises estimating based on a previously determined execution profile for said target device. Alternatively or additionally, estimating comprises estimating based on a previously determined execution profile for a different device.

There is also provided in accordance with an exemplary embodiment of the invention, a method of managing data in a distributed support network, comprising:

providing a maintenance network including a user site and a multi-device servicing site that provides maintenance to at least one target device in said user site;

collecting and transmitting a collection comprising at least one of data and maintenance-related information from a plurality of different components of said maintenance network to a server, at least said collecting being initiated by said server; and maintaining said target device using said collection. Optionally, said server performs maintenance of said target device. Optionally, said server manages a maintenance process for said target device. Alternatively or additionally, said server manages comprises a site server associated with a plurality of devices located at a same site as said target device. Alternatively or additionally, said server is included in said servicing site.

In an exemplary embodiment of the invention, collecting comprises requesting data or information from said components when needed by said server.

In an exemplary embodiment of the invention, said maintenance related information comprises at least one of a set of diagnosis rules and a log collection definition. Optionally, said different components are arranged in a hierarchy and wherein said information is retrieved from a higher level member of said hierarchy.

In an exemplary embodiment of the invention, said data comprises device data. Optionally, said different components are arranged in a hierarchy and wherein said target device data is retrieved from a lower level member of said hierarchy. Alternatively or additionally, said data was previously retrieved from said target device for reasons other than the need of said server.

In an exemplary embodiment of the invention, part of said data is stored in multiple locations in said network. Alternatively or additionally, said data is managed separately from a maintenance process of said target device.

In an exemplary embodiment of the invention, the method comprises forwarding a maintenance request to a component of said network, with a link to data associated with said network, wherein said collecting comprises following said link.

BRIEF DESCRIPTION OF THE FIGURES

Non-limiting embodiments of the present invention will now be described in the following detailed description, with reference to the attached drawings, in which.

DETAILED DESCRIPTION OF EXEMPLARY EMBODIMENTS

Overview

Figure 1:
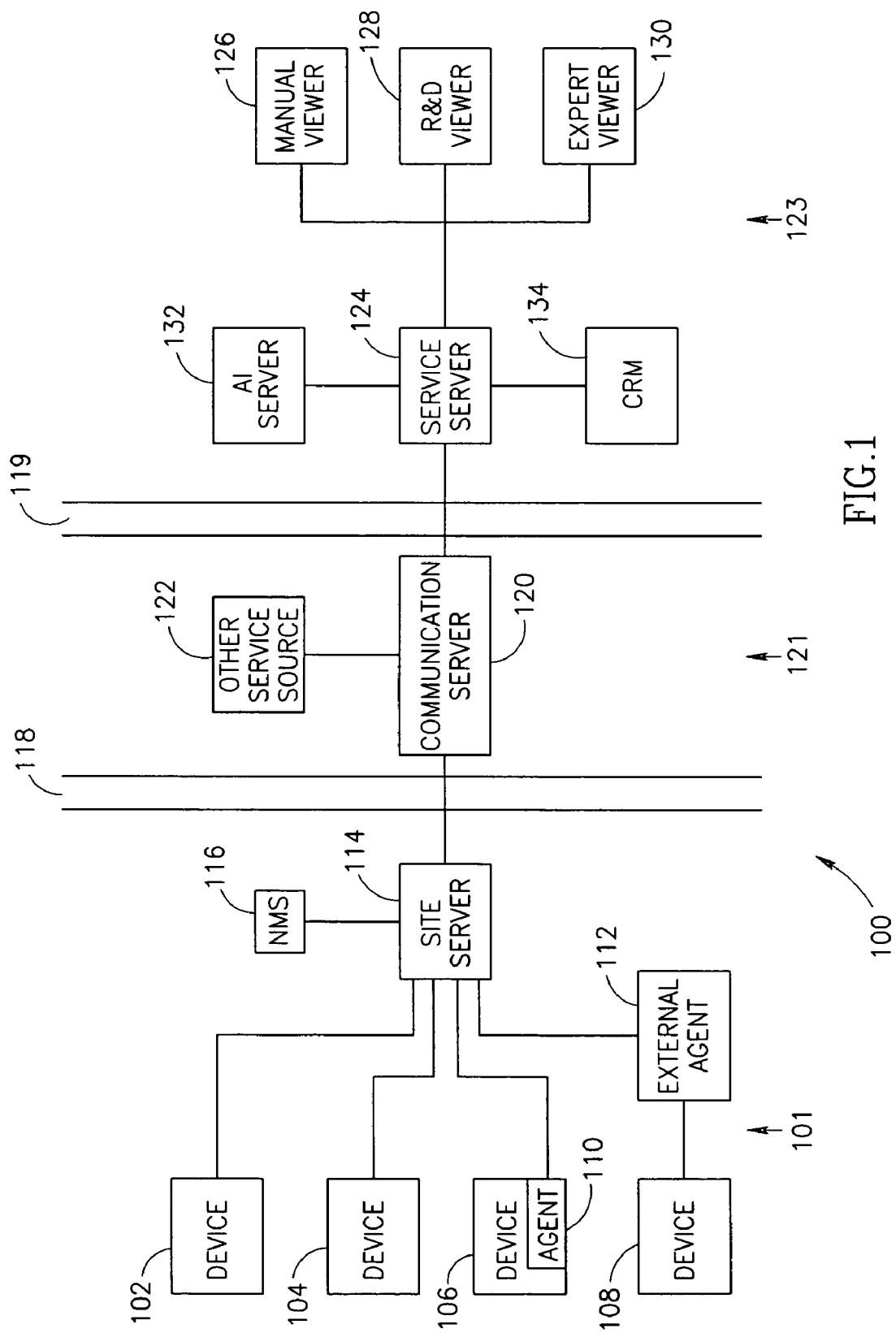
FIG. 1 is a schematic block diagram of a service network, in accordance with an exemplary embodiment of the invention.

FIG. 1 is a schematic block diagram of a service network configuration 100, in accordance with an exemplary embodiment of the invention. A plurality of devices 102, 104, 106 and 108 at a user site 101 are shown as receiving service and/or servicing management from a service site 123. This service may be provided across a communication network, for example an Internet section 121. Optionally, as described below, a firewall 118 may protect user site 101 and/or a firewall 119 may protect service site 123. As will be explained below, various configurations are contemplated for user site 101 (with respect to providing services), Internet section 121 and/or service site 123. In particular, various automated methods are applied in accordance with some embodiments of the invention.

In an exemplary embodiment of the invention, functions of a maintenance server are provided by one or more service sites 123. Alternatively or additionally, at least some of the functions are provided by components located at the user site. Thus, as will be explained below, in some embodiments of the invention, a logical entity of a maintenance server is emulated by a plurality of different components, which are linked together, for example in a hierarchy.

Various types of service and/or maintenance may be provided, for example, one or more of:
 (a) device diagnosis;
 (b) fault correction;
 (c) preventive maintenance;
 (d) failure prediction; and/or
 (e) configuration management and device updating.

It should be appreciated that a single user site can be connected to multiple Internet sections 121 and/or to multiple service sites 123. Alternatively or additionally, a single Internet section can serve multiple user sites and/or multiple service sites. Alternatively or additionally, multiple Internet sections may be provided, even for a single user site or a single service site, for example, to improve redundancy. Alternatively or additionally, a single service site can provide service for multiple user sites.

User Site

In an exemplary embodiment of the invention, user site 101 includes one or more site servers 114. In an exemplary embodiment of the invention, site server 114 is operative to perform, for example, one or more of the following functions:

(a) monitoring, filtering and/or managing information transfer between devices 102-108 and service site 123;

(b) performing local servicing functions (described below), for example, automatically analyze data and perform actions to alert to faults, fix faults, collect data and/or diagnose faults;

(c) emulating a smart agent for devices that do not include such an agent;

(d) communicate with other local systems (such as NMS 116, described below), for example for data exchange;

(e) alert other devices or servers to device malfunctions;

(f) provide analysis and display tools for local users;

(g) collect data from the devices through standard protocols such as SNMP, TL-1, Telnet scripts and CMIP;

(h) collect data upon receiving network events such as SNMP alarms, for example collecting detailed configuration data when receiving an SNMP alarm; and/or (i) managing collection profiles per device, e.g., what data to collect periodically, and on each event. Exemplary collection profiles define one or more of the parameters to be collected (e.g., 1, 2, 5, 10 or any larger, smaller or intermediate number) and execution profiles to be tracked. Optionally, sets of parameters and/or code sections to be tracked are selected as groups.

In some embodiments, the functions of site server 114 are carried out by the devices themselves and/or by components inside or outside of user site 101, for example instead of site server 114 or as a backup to site server 114.

Optionally, user site 101 includes network management services (NMS), for example as a separate NMS server 116, or integrated with site server 114.

In an exemplary embodiment of the invention, site server 114 is implemented as a Java program. Alternatively, it may be a standard program, for example, executing under the Microsoft Windows operating system. Other components of network 100 may be implemented, for example, as standard compiled code (e.g., C++), as Java or other network code and/or as application specific add-ons, for example, implementing a viewer (described below) using a WWW browser.

Optionally, the user site includes a service server, such as viewer (e.g., manual or expert, described below) or an AI server, to assist in performing local maintenance.

Internet

In an exemplary embodiment of the invention, Internet 121 includes a communication server 120 for managing and/or monitoring communications between user site 101 and service site 123. Alternatively or additionally, Internet 121 includes a connection to another service source 122, for example, one that is not behind a firewall. Possibly, user site 101 can select different devices to be serviced by different service providers and/or be allowed to bid between service providers.

In an exemplary embodiment of the invention, communication server 120 is used as a WWW server to present information to a viewer.

Alternatively or additionally, communication server 120 integrates information from multiple locations, for example, allowing an operator (e.g., at user site 101) to view failure statistics of a particular device installed at multiple user sites. Alternatively or additionally, other information may be displayed, for example, a vendor's frequently asked questions list, information from network management systems and/or device updates.

Service Site

In an exemplary embodiment of the invention, service site 123 includes one or more service servers 124, that respond to and/or initiate service activities. Service site 123 can provide one or more of manual servicing, manually-mediated servicing and automated servicing. In an exemplary embodiment of the invention, an optional manual viewer 126 is used for manual servicing. An optional expert viewer 130 is used for manually-mediated servicing. An optional AI (artificial intelligence) server 132 is used for automated servicing.

In an exemplary embodiment of the invention, service site 123 is run by a manufacturer of devices 102-108. Alternatively, service site 123 is run by a service provider. Alternatively, server site 123 distributes servicing work between multiple servicing providers. Possibly, a service server 124 determines the manufacturer of the faulty device and forwards the request for service to an appropriate server or service site. Alternatively or additionally, such redirection may be practiced by communication server 120 and/or site server 114. Optionally, site 123 includes a customer resource management tool 134, which may be integrated with service server 124. Such a tool may be used, for example, to track the usage and distribution of the manufacturer devices.

In an exemplary embodiment of the invention, service site 123 includes an R&D viewer 128, in which R&D personal of the manufacturer can analyze service needs and use the information for future designs. Alternatively or additionally, this viewer is used as a test location for various device updates and/or for remotely controlling testing of new device versions at user site 101.

EXAMPLES OF USE

In an exemplary embodiment of the invention, device 102 is a washing machine. Site server 114, for example a home automation computer, schedules periodic maintenance (e.g. ten consecutive clear water washes after every 2000 gallons of water pass through the machine) for device 102. A problem is detected in device 102 during the maintenance (e.g. variations in wash cycle time). Site server 114 uses communication server 120 to forward a request for help to service site 123. Service server 124 forwards the request to AI server 132, which generates an appropriate response. A response back to site server 114, is for example, to log more data or to have the water filter checked (e.g., by a human). Possibly, additional logging will determine the variation is synchronized to time of day, and the cause might be simply variations in water pressure. Alternatively, additional logging may determine that it is the spin cycle that is varying in duration, indicating a possible friction problem. Possibly, the further analysis is managed by service site 123 and/or by site server 114.

In another example, device 102 is a router, which provides a fault alert to site server 114. The response of service site 123 may be, for example, a patch.

In another router example, a router user changes the configuration of the router at night and causes a problem that only shows up during peak traffic hours of next evening. When the fault is detected, the servicing provide checks the configuration history of the router and resets the router to a previous configuration that worked. Such setting may be manual or automatic.

One advantage of a router is that, as a networking device it is naturally connected to networks. Another advantage is that a router may include available memory and/or CPU power for various uses, an appliance, may be more limited.

Exemplary Communication Protocol

While any known communication protocol may be used, for example, a direct connection, in an exemplary embodiment of the invention, user site 101 and/or service site 123 are protected by a firewall 118 and/or a firewall 119, respectively. Such firewalls may block normal communication methods, such as most direct connections. Direct connections may be undesirable for the reason that they allow the propagation of viruses, access to devices that are not being maintained and/or invade the privacy of user site 101. In an exemplary embodiment of the invention, an intermediate component (e.g., site server 114) is placed intermediate the device and the service server, for example, to filter the passing data and requests. Alternatively or additionally, no direct connection communication method is used.

Figure 2:
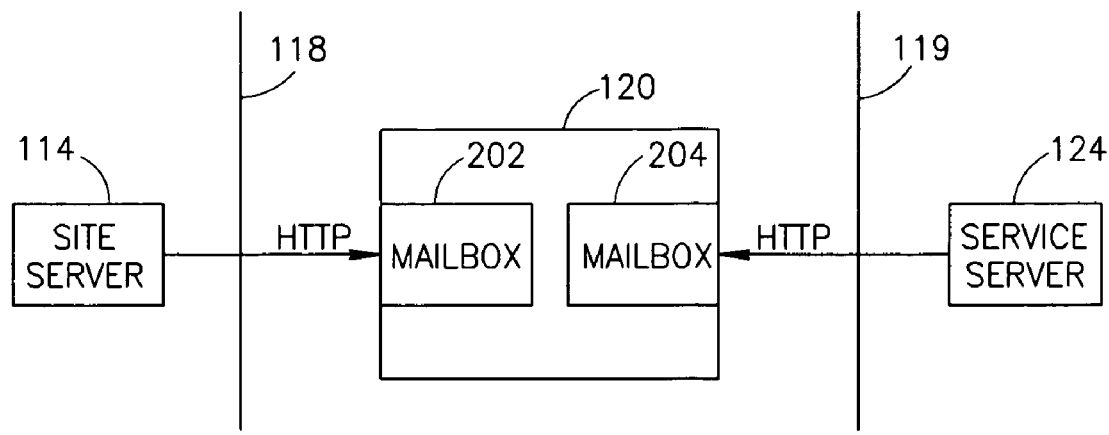
FIG. 2 illustrates a mailbox based communication configuration, which can be used to bypass firewalls, in accordance with an exemplary embodiment of the invention.
Figure 3:
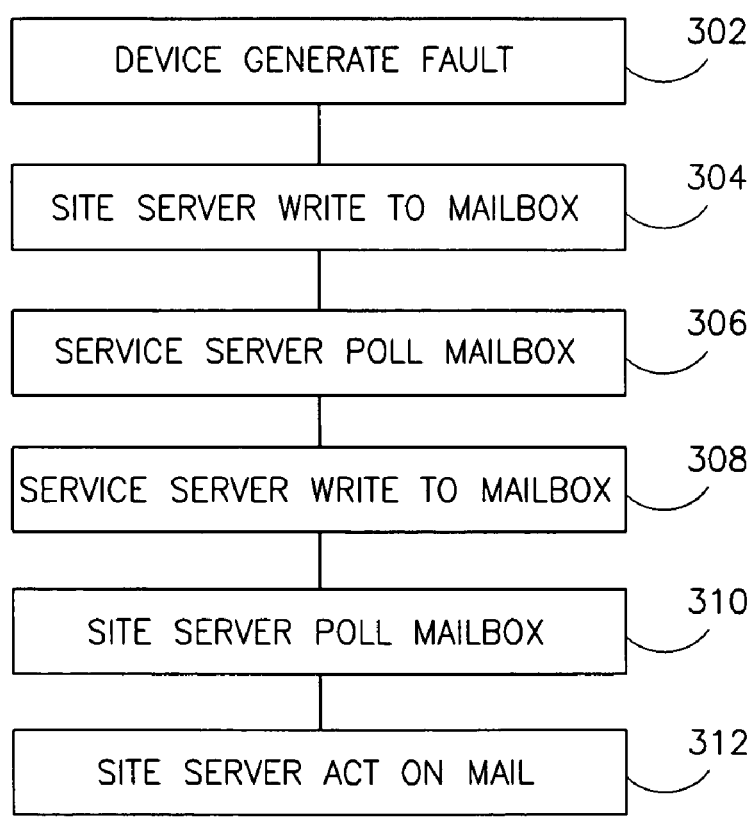
FIG. 3 illustrates a method of communicating using the configuration of FIG. 2.

FIG. 2 illustrates a mailbox based communication configuration 200, which can be used to bypass firewalls. FIG. 3 illustrates a flowchart of a method of communicating using the configuration of FIG. 2. In an exemplary embodiment of the invention, the communication out of the firewall uses an HTTP protocol for sending a request and for retrieving files (responses) from mailboxes. Alternatively, other protocols that work through a firewall may be used, for example SNMP.

A device (e.g., device 102) generates a fault condition (302). Site server 114 writes a request to a mailbox 202 on communication server 120 (304), in response to the fault. Service server 124 periodically polls a mailbox 204, associated with it on communication server 120 and retrieves the request (306). After handling the request, service server 124 places the response in mailbox 204 (308). Site server 114, which polls mailbox 202 reads the response (310) and acts on it (312). Although two mailboxes are shown, such a protocol may be implemented with a single mailbox or with multiple mailboxes.

Optionally, the mailbox system is used as a relay, for example, for providing SNMP, Telnet or other protocols over the mailbox protocol. In an exemplary embodiment of the invention, the messages in the mailboxes are protected, for example, using an SSL secrecy method. Alternatively or additionally, the messages are limited to be from a set of message types, for example, "instruction to log" and "problem announcement". Alternatively, the content of the messages is interpreted by the respective servers, and there is no limitation on their content.

Optionally, the different communicating parties are authenticated to prevent spamming.

In an exemplary embodiment of the invention, an administration function is provided, to allow an administrator to log on to communication server 120 and view, reorder, insert or delete messages from the mailboxes. Optionally, communication server 120 imposes a quota (e.g., on size of log files) and/or can send messages of its own, for example, requiring a server to increase its mailbox polling rate, so that the server's mailbox is not too full.

Various types of physical networks may be used for configuration 100, for example, dial-up, satellite, e-mail, RS-232, radio, wired networks, Internet and/or off-line connections (e.g., diskette passing). In addition, hybrid networks, including multiple different segments may be supported.

In an exemplary embodiment of the invention, the various elements shown in FIG. 1 cooperate to emulate a virtual service network, which interconnects devices, various servers, human maintenance personnel and/or servicing providers.

In an exemplary embodiment of the invention, the interconnected components include multiple human persons, located at remote locations and working on a same device or family of devices, for example, a first team testing a device in a laboratory and a second team, at a user site, which is attempting to debug the same device as being tested in the library. Alternatively or additionally, the network may interconnect various experts and/or different expert programs.

Privacy

While, in some embodiments of the invention, the servicing will be provided at site 101, in other embodiments and/or in difficult faults, servicing from outside site 101 may be required. Typically, a user will not desire that an outside entity, no matter how trusted, will have too much information about the user site and/or an undue ability to affect the user operation. These limitations on privacy may be desirable at various hierarchical levels (in a hierarchical support network). Optionally, several of the levels in the hierarchy can define privacy setting protecting it from higher, lower or same-level members of the hierarchy. Alternatively or additionally, the device itself can be configured to allow a certain access level. This configuration may be pre-programmed or it may be set, for example by site server 114.

A first solution, in accordance with an exemplary embodiment of the invention, is to fake some of the information sent out of user site 101 so that the actual happenings remain secret, for example:

(a) insert spurious service calls, for real or fake devices;

(b) fake log entries;

(c) change log data;

(d) use fake device ID numbers;

(e) using a single device ID, a larger "pool" of device IDs, or fewer than all real device IDs when sending data or making a request;

(f) filtering out (e.g., by site server 114) of the traffic, for example, incoming requests and/or outgoing data;

(g) collating multiple service request or data outputs into single files, where appropriate; and/or (h) changing the temporal distribution of requests, data reports and/or the order of messages from different devices.

Optionally, a doctored set of data is maintained in user site 101, for example, for providing data when diagnostics are executed by a remote service provider.

Alternatively or additionally, the servicing may be performed off-line, so that the operation at user site 101 can be minimally affected by the servicing. Optionally, device 102 is disconnected from linked devices, to reduce access of the service provider to user site 101.

Alternatively or additionally, only some information is sent out of user site 101, for example, without device IDs, without geographical location and/or without an identification of the user site (e.g., to prevent a manufacturer from stealing clients of an appliance salesman).

Alternatively or additionally, service site 123 may be limited in the type of request that it may make of devices 102-108, for example, limited in the fields of a log file, limited to certain log file formats, log file lengths, auxiliary instructions and/or number of devices it can access and/or be prevented from sending an automatic patch. Possibly, the hiding of information may take the form of encapsulation of part or all of the configuration at user site 101 or by not responding, for example, by blocking responses or by the components at user site 101 not generating a response at all.

Although the settings of the privacy/access levels may be provided by service site 123, communication server 120 or by a third party (e.g., at installation or purchase), in an exemplary embodiment of the invention, an operator at user site 101 has control over the privacy policy. Various methods of defining privacy levels for networked elements are known in the art and may be applied.

In an exemplary embodiment of the invention, four levels of privacy may be set for different devices:

(a) no access;
(b) allowed to get (e.g., some or all parameters);
(c) allowed to set parameters (e.g., of agents) and/or give instructions; and
(d) bridging allowing a full diagnostic protocol, for example, Telnet, for example, being emulated over a mailbox communication protocol as described above.

Different service sites and/or service providers may be allocated different permission levels. Alternatively or additionally, different devices, even in a same user site may have different access permission levels.

In an exemplary embodiment of the invention, a diagnosis process includes executing previously successful and previously failing data sets on a device. In an exemplary embodiment of the invention, the selection of data sets, execution and determination of failure is performed by a trusted site server, so that only an indication of failure or other neutral information, such as relative processing rate, needs to be provided to an external entity.

Servicing Stations and Locations

The actual servicing of a faulty device can include one or more of the following activities:

(a) giving instructions to a human operator;
(b) automatic, temporary or permanent updating of software on the device;
(c) instructing one or more devices to collect data and/or perform acts;
(d) analyze fault symptoms and/or logs; and/or
(e) managing a diagnosis and/or repair session.

These activities may be performed at one or at several places, even for a single fault and/or repair session. In an exemplary embodiment of the invention, some or all of these activities are performed at a single servicing site 123. Alternatively, a network of sites, possibly with overlapping capabilities, are provided. Alternatively or additionally, a hierarchical setup of servicing sites may be provided, for example, with the most difficult problems being forwarded to a particular sites and/or with different sites specializing at different problems. In a hierarchical setup, some service servers may be in a position to both generate and/or forward requests to higher level servers and to perform (or forward) actions they are required to by such servers.

In an exemplary embodiment of the invention, the servicing sites are protected by firewalls. Alternatively at least some of the servicing sites are freely accessible on the Internet or via another communication network, for example, integrated with communication server 120.

In some cases, configuration 100 acts in a distributed manner, in that one component of configuration 100 uses a second component of the configuration, for example, for data acquisition (e.g., site server uses agent) for data retrieval (e.g., site server uses support server) and/or data processing (e.g., agent uses site server to analyze data).

Site Server

Site server 114 may provide a lowest level of servicing-related management, for example periodic maintenance, detecting faults, managing agents that are embedded in devices and/or emulating an agent. Alternatively to managing at least part of the maintenance of the local devices, site server 114 may treat each new communication as unrelated to previous communications regarding a particular device.

Alternatively or additionally, site server 114 may be programmable by remote servers, for example, to manage a servicing session. Such reprogramming may be achieved, for example, using scripts, configuration files or by providing patches or replacement code for server 114. Often, a user site 101 will prefer to have local servicing attempted before going for outside help.

In an exemplary embodiment of the invention, site server 114 uses rules to analyze logs and data from devices and/or to determine timing for periodic maintenance. In an exemplary embodiment of the invention, site server 114 downloads these rules form service site 123. Alternatively or additionally, service site 123 provides various relevant links to site server 114, for example, FAQs, software updates and/or corrective procedures. Optionally, site server 114 controls the timing of updating of local rules.

In an exemplary embodiment of the invention, same sets of rules are provided to site servers at different user sites 101. Alternatively, different sites servers may be provided with different rules, for example, responsive to the type of site and/or the type of maintenance and/or reliability solution favored by the individual site. In an exemplary embodiment of the invention, service site 123 performed the adaptation of the available rule sand information for each site server. Alternatively or additionally, to providing rules, service site 123 may provide data collection profiles, for example, for specific faults or for periodic retrieval. Such a profile can include, for example, the parameters collected and the method of collection (e.g., logging, polling).

Alternatively to a separate site server 114, server 114 may be distributed between different devices or embedded in one of the devices.

Service Server

Service server 124 may distribute servicing requests among multiple servicing stations, for example, as shown in FIG. 1.

The management of a particular device problem request may be passed on to a different server or it may be managed by servicing server 124. Alternatively, each communication from the device is treated as a separate activity by servicing site 123. Optionally, each such activity utilizes a device file that is updated with the last servicing activities of the device. In an exemplary embodiment of the invention, servicing server 124 translates between one or more instruction protocols used by the servicing stations or protocols for receiving data from devices.

In one example, site server 114 and/or servicing server 124 and/or the individual servicing stations can interact with multiple agent types and/or data retrieval protocols, for example, agent mediated logging and capture, Telnet, SNMP and polling.

Manual Viewer

Servicing site 123 may include a manual viewer 126 that is used by a human operator to provide service. This and the following described viewers may also be provided at user site 101. Optionally, the viewer is implemented using a browser at the viewing station. A WWW server may be provided, for example, at service server 124.

In an exemplary embodiment of the invention, a design tool is provided for defining displays for a manual viewer, for example, a tool for building a graphical user interface. Alternatively or additionally, a tool is provided for browsing devices on the virtual servicing network, for example, using a hierarchic arrangement. Alternatively or additionally, a tool is provided for managing an agent on a device (or an agent shared among devices), for example, setting hooks in the agent (described below).

Expert Viewer

Expert viewer 130 may be designed for a better qualified operator. Alternatively or additionally, such an expert viewer may have additional analysis tools and/or the ability to compare different devices and/or user sites. Expert viewer station 130 may also include computer-assisted abilities, for example, the ability to select and apply data logging and analysis scripts.

In an exemplary embodiment of the invention, when a viewer station receives a data set, the data set is displayed in a manner that indicates problems. In an exemplary embodiment of the invention, a plurality of analysis rules is applied to the data to detect faults, inconsistencies and/or problematic values. In an exemplary embodiment of the invention, the indication is color coded, for example, to indicate thresholds that are passed. Alternatively or additionally, the display is adapted to focus on the cause and/or indication. For example, if the analysis rules determine that a data rate parameter has a bad value, the display will show a graph of the data rate parameter. Optionally, associated (e.g., effecting or affecting) parameters will be shown as well. Alternatively or additionally, warnings and/or error messages will be shown.

Optionally, the viewer station sends a request for more data collection, for example, to enhance data in the display and/or based on an identification of useful data by the data analysis rules. Optionally, the viewer station can request an update or an original data set, of a predefined or of an ad-hoc collection of parameters.

AI Server

In an exemplary embodiment of the invention, AI server 132 is used to automatically manage and/or perform at least some of the servicing and/or diagnosis activities. In an exemplary embodiment of the invention, server 132 includes a learning module, for example a rule based module, a learning by example module or a neural network, to facilitate such learning. Possibly, a plurality of AI servers are provided, with different ones having different capabilities, for example, only a basic automated servicing component being provided at user site 101.

In an exemplary embodiment of the invention, AI server 132 and service server 124 (which may be integrated into a single component) cooperate in the following manner. When a request is received, if the request can be handled automatically, its is handled by AI server 132. Otherwise, it is forwarded to a suitable human operator (or a remote, more advanced or specialized AI server). Possibly, some requests that could be handled automatically are handled manually, for example, if the request include such an indication, based on a service plan of the requester and/or based on availability (e.g., load balancing between different service providing components).

As noted above, user site 101 (and/or an unrelated remote site) may also include a viewer or an AI server, for example, to support local maintenance.

Agent

Referring back to FIG. 1, four types of agents are shown. Device 102 does not require an agent, for example, the device supporting polling reading of data. Device 104 uses an agent emulated by site server 114. Device 106 has an embedded agent 110, for example as described in the above referenced application filed on even date as this application, the disclosure of which is incorporated herein by reference. Device 108 includes an external agent 112, for example, for devices where an internal agent cannot be installed. Intermediate implementations are also contemplated, for example, some of the agent residing in the device and some residing (or being emulated) in site server 114 or in a separate unit.

A potential advantage of an agent (which may also be provided, to some extent by a site server) is providing maximal flexibility in defining, modifying and applying data acquisition. The presence of an agent allows, in some embodiments of the invention, data to be logged even if there is no real-time connection to a maintenance provider and also allows logging and/or data storage to be adapted to the instantaneous condition of the device. By downloading a suitable script to the agent, some pre-maintenance activities, such as testing the effects of various patches, may be applied as well by the agent.

Figure 4:
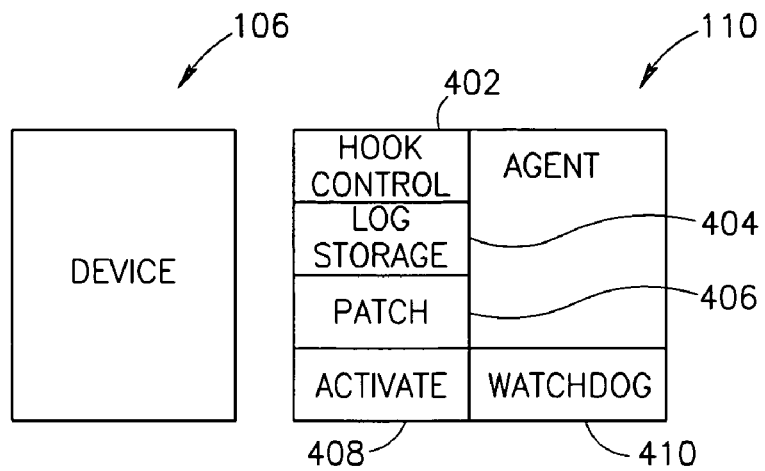
FIG. 4 is a schematic diagram showing parts of an agent that is integrated into a device, in accordance with an exemplary embodiment of the invention.

FIG. 4 is a schematic diagram showing parts of an agent (e.g. agent 110) that may be integrated into a device (e.g., device 106), in accordance with an exemplary embodiment of the invention. In an exemplary embodiment of the invention, such integration is achieved by providing the agent as software on a CPU of device 106. Possibly, the agent is a separate, generic, set of routines. Possibly, the agent interacts with device 102 via hooks and/or by inserting instructions into a command stream of device 106. In some embodiments, at least one hook is active at all times, to ensure that control transfers to agent 110, at least periodically. The various elements shown in FIG. 4, may be divided up differently, for example, combining two or more elements into a single element, splitting up of an element, adding elements and/or omitting one or more element.

In an exemplary embodiment of the invention, agent 110 includes an optional hooking control 402 for managing hooks. Alternatively or additionally to pre-designing the embedded software in device 106 for remote maintenance of device 106, in an exemplary embodiment of the invention, a stand-alone hooking control agent is provided, which may be provided as an add on (e.g., separate process) or integrated with the embedded software (e.g., as part of the operating system). In an exemplary embodiment of the invention, the hooking control handles data acquisition and/or translating remote commands and/or scripts into location activity, for example by executing suitable software routines. In an exemplary embodiment of the invention, a hook comprises a section of software including a conditional test, which, if it succeeds, calls a "hooked" function. The hooked function can perform various activities such as data collection and variable setting. Optionally, the condition includes checking a list of activated hooks. Alternatively, a hook may be implemented as a software patch that replaces existing software, with a call to the hooked function. Other hooking methods and methods of interacting with embedded software are known in the art and may be used.

An optional log storage 404 is used to store logged data. Alternatively, data may be transmitted out (e.g., to site server 404 or external agent 112) as soon as it is acquired. A local storage is especially useful when a collection assignment is given to agent 110, for example from site server 114 or from servicing site 123. Alternatively or additionally, local storage may be used when a connection fails or is limited in some manner (e.g., limited bandwidth). In an exemplary embodiment of the invention, storage 404 includes non-volatile memory, so that pre-crash data can be retrieved after a crashed device is restarted. Optionally, agent 404 detects an impeding crash and stores useful information and/or logs in the non-volatile memory. Alternatively or additionally, pre-crash information may be stored by site server 114.

Optionally, device 106 includes a watchdog control 410 that monitors the operation of the device and warns of potential future failures, expected failures and/or undesirable commands from the operator. The watchdog may be updated, e.g., from a servicing server with state vectors and/or event sequences that were found, on other devices, to be indicative of (or cause) a potential failure. Like hooking control 402, watchdog 410 may be an integral part of the operational software used to perform the functions of the device, but is preferably, at least in part, separate. In an exemplary embodiment of the invention, following an alert by the watchdog, site server 114 may request a diagnosis by a service site.

In an exemplary embodiment of the invention, when watchdog 410 (or site server 114) generate an alert, the alert may be displayed by device 106, for example, if the device includes a suitable display. Alternatively or additionally, the alert may be displayed on an associated device, for example, a nearby device or on site server 114. Alternatively, other alerting means, such as a pager, may be used. Alternatively, the alert may be forwarded to a servicing provider, and a suitable warning message returned, as a response from the servicing provider, for display by device 106 or by other means.

Optionally, agent 110 includes a patch element 406, for patching of software of device 106. In an exemplary embodiment of the invention, patch element 406 replaces real-time software of device 106, on the fly, when execution is not at the patched location. Optionally, agent 110 and/or a more central servicing provider keeps track of the effect of patching the software at different software conditions.

Optionally, agent 110 includes an activation element 408, which may be used to activate certain functions of device 106, for example, functions or parts of functions that are usually activated by a user or by special conditions.

In an exemplary embodiment of the invention, agent 110 is used for real-time diagnosis of device 106, with various instructions being provided to agent 110 and the results of carrying out the instructions being transmitted from agent 110 to site server 114. Such instructions may include, for example, testing (e.g., patching or activating), repair (e.g., patching) and logging.

Data Storage

Various types of data may be stored on virtual service network 100, including, for example, one or more of:

(a) device configuration profiles and instantaneous state;

(b) log files and other data collected from devices, for example by polling, such as performance, configuration and internal variables;

(c) log file formats;

(d) maintenance and/or test instructions;

(e) scripts, for example, for carrying out testing, maintenance, data collection, configuration setting and/or software repair;

(f) pre-failure profiles;

(g) diagnosis and/or repair instructions;

(h) replacement code;

(i) maintenance sequence state (e.g., step in a maintenance instruction sequence);

(j) symptom listings;

(k) fictitious setups;

(l) device files, including, for example, logging of support activities and predefined log file formats;

(m) billing information; and/or (n) a log of all the events that occurred at the service network (e.g. logging of all the communications so that a user and/or service provider can check that a service level agreement is met). Possibly, the data pertaining to a particular user site is available to that user on request, for example as a query from a central database. Optionally, automatic analysis tools for determining that a service level is met are provided, for example at viewer stations.

The various data may be stored at a central location, for example, in service server 124. Alternatively, a distributed database model may be used. However, in an exemplary embodiment of the invention, some of the data may be stored at other places, for example locally where it is generated or used, for example, for preserving privacy, for enhancing retrieval time and/or for providing locally personalized views of the data and/or servicing network.

In a particular example, an agent associated with a failing device may transmit a log file including additional information so that the servicing server that analyses the fault condition is not require to continuously communicate with the device. This may also allow the communication to be essentially off-line.

In an exemplary embodiment of the invention, a hierarchical distributed database is provided by the various components of configuration 100. For example, data from a device is stored at site server 114. Some of this data or a link to the data (which is stored at site server 114) is forwarded to service site 123 with a request for maintenance. Additional data may be requested from the device by a viewer station and stored at the viewer station. A link to the data may be stored in a device file maintained at service site 123. When an AI server requires for analysis, the server can follow the links and requests the relevant data from wherever it is stored.

Alternatively or additionally, by forwarding links to data rather than data, the data for a device may be managed separately form a repair process, which, for management purposes may only require a link to some of the data. As noted herein, an actual maintenance process may include contribution from multiple components, each of these components may be forwarded a list of links to the data and the components only request the data that they need. Some data may be stored at multiple locations, for example, for backup purposes, for speed of retrieval and/or for preserving privacy by minimizing request for data from "private" components.

R&D Integration

In an exemplary embodiment of the invention, the process of providing servicing is integrated with an R&D process. Such integration may include, for example, utilizing the servicing network to try out new ideas. Alternatively or additionally, the integration includes using the servicing information to direct R&D.

In a particular embodiment of the invention, the integration is used to assist debugging where the "bug" is elusive and is not repeatable in a laboratory. By linking laboratory workers and field workers that view the same or similar device, finding such a bug and determined why the bug was not repeatable, can be achieved. Such linking may allow a same test to be executed on the two devices. Alternatively or additionally, such a test may be used to determine or enhance the repeatability of a bug that is discovered in a laboratory or in the field.

For example, the integration may include one or more of:

(a) Bug (e.g., design flaw) distribution tracking. For example, for determining relative occurrence, criticality and/or other statistical parameters of faults. In an exemplary embodiment of the invention, devices may be put on notice (e.g., via agents or site servers) to log information and/or track the occurrence and/or the effect of a bug.

(b) Version testing. For example, determining the usability and/or relative value of new versions of software. Such monitoring can also include monitoring of the usage of new features, even if they do not fail or cause faults.

(c) As an input for assisting in detecting design flaws. In an exemplary embodiment of the invention, an engineer on R&D viewer 128 can analyze various problems that come up, to determine if they are caused by a same source. In a particular embodiment of the invention, such an engineer may initiate cross-device testing to attempt to verify that the design flaw exists and/or has a particular cause.

(d) cross-device testing. As a plurality of same or similar devices are being monitored by a single entity (the network) it is possible to run various test scenarios on multiple devices, for example, to uncover device flaws and/or to determine device longevity statistics. Alternatively or additionally, such testing may be used to compare different versions, for example versions under development.

Exemplary Maintenance Possibilities

Configuration 100 may be used to apply various types of maintenance. The type of maintenance actually provided may depend, for example on cost considerations, privacy considerations and/or ability to interface an agent with the device to be monitored. While automatic maintenance is often desired, in many instances, manual and/or manually mediated maintenance may be better, more cost-effective and/or required in order to provide information into the system.

In an exemplary embodiment of the invention, human input is used to provide the maintenance, for example, to provide user-specific or vendor specific data analysis and/or repair rules.

In some embodiments of the invention, human performance is periodically compared to automated performance, for example, to detect desirable advances in programming or in training. Such comparison may include automatic tracking of performance and generation of a report to a human operator.

It should be appreciated that many, but not all, maintenance functions require a significant amount of data transmission and/or level of details of data exposed (or used in other ways). For example, mere statistics of overloads in a router may be insufficient for maintenance, even if sufficient for network management (e.g., when should a new router be bought). Instead, an actual log of the various events may be required.

Preventive Maintenance

In an exemplary embodiment of the invention, preventive maintenance includes testing and/or modifying a device not in response to, but in anticipation of a failure state. Preventive maintenance may be applied, for example, when a waning situation occurs, for example, strange sounds from a washing machine, which may be detected by a person. Alternatively or additionally, preventive maintenance may be applied periodically, for example on a regular schedule, such as based on device usage, time of year, time of day, device age and/or device wear level (e.g., as determined in a test).

In an exemplary embodiment of the invention, testing includes logging current parameters in a device. Alternatively or additionally, testing includes logging while performing a special task, for example, an empty wash. Alternatively or additionally, testing includes instructing the device to collect a log over a considerable period of time. Optionally, the items to include in such a log are selected based on one or more device specific characteristics that might effect the probability of an error state occurring. Alternatively or additionally, testing includes periodically polling for SNMP or Telnet data and analyzing trends or executing built-in tests of the device.

Alternatively or additionally, preventive maintenance includes performing acts that are expected to prevent future failure states. Possibly, data collection is accomplished during these tests, and analyzed to assist in anticipating future failure. Such analysis may be general or it may be limited or more detailed on parts of the log that relate to expected failures. Exemplary preventive acts include running a washing machine on multiple empty washes (e.g., to remove soap deposits), instructing a person to perform an act (e.g., replace a gasket), reformatting a disk, performing self-calibration, reacquisition of data, such as environmental parameters and/or a network neighborhood and clearing storage (e.g., an associative cache or a history folder).

In some embodiments of the invention, such preventive maintenance (and/or other maintenance as described below) utilize a separate software or hardware unit that instructs a user to operate the device and/or itself operates the device.

In an exemplary embodiment of the invention, the results of such preventive maintenance and/or testing are used to generate a statistical model of expected failures for the device. Such model may be used, for example, by a manager of user site 101, for example to plan in-depth device maintenance or spare parts purchases, and/or by service site 123, for example, to suggest support packages and/or to determine the requirements for future support facilities.

In an exemplary embodiment of the invention, management of preventive maintenance, includes deciding the period of maintenance and/or what maintenance to apply, viewing the results of tests applied during and/or after the maintenance and/or deciding on further maintenance based on the results. Optionally, a device record is maintained (and referenced to for automatic decision making) showing what preventive or other maintenance the device had and/or expected operational parameters and/or usage parameters.

Avoidance

In an exemplary embodiment of the invention, configuration 100 is used to help avoid fault situations.

In one example, periodic testing results may be use to modify acceptable threshold in a device. For example, a router may be set to only accept a bandwidth lower by 10% that would otherwise be acceptable. Commands that exceed the threshold may be rejected by the router. A router may be programmed (e.g., by parameter change) by remote. Alternatively, the application of thresholds is by an embedded agent or by modifying the software of the device.

Alternatively or additionally, to setting thresholds, one or more alert situations may be defined to match expected pre-failure profiles. When such a pre-failure profile is detected, an alert is generated. Optionally, an operator (or an automatic controller) may reduce the load, shut down and/or perform another preventive activity on the device. Alternatively or additionally, the alert is used to execute a script, for example, an in-depth logging and/or analysis script.

Avoidance activities may be matched, for example, to device age, determined failure rates (e.g., as a function of various input parameters to the device) and/or a usage profile of the device.

In an exemplary embodiment of the invention, management of the avoidance process includes checking if the desired fault was actually avoided.

Diagnosis

In an exemplary embodiment of the invention, diagnosis is achieved by applying a series of tests and monitoring the effects of the tests, for example, by logging or polling for data. Alternatively or additionally, diagnosis is achieved by analyzing pre- and/or post failure logs. In an exemplary embodiment of the invention, diagnosis includes determining which of a plurality of fault states is occurring, for example, there may be 3, 10, 20, 50 100 or any larger, smaller, or intermediate number of fault states to diagnose. Alternatively or additionally, the fault diagnosis may be continuous (e.g., percentage of overload). In an exemplary embodiment of the invention, the diagnosis may be based on one or more tests applied to the device (e.g., 2, 10 or 15 tests). Alternatively or additionally, the diagnosis is based on the analysis of one or more logs, for example, 2, 3 7 or 10 or any smaller, larger or intermediate number of logs. Such a log may include one or more records, for example, 10, 100, 1000 or any smaller, larger or intermediate number of records.

In an exemplary embodiment of the invention, the analysis is directed to the behavior of the specific device. Alternatively or additionally, the analysis is directed to the behavior and/or failure of other, possibly similar, devices. Alternatively or additionally, the analysis is directed to the current behavior of other devices, achieved, for example, by applying a test diagnostic to multiple other devices, possibly at different user sites, by coordination of one of the components in configuration 100. For example, site server 114 may request that servicing site 123 obtain test diagnostic results from 5 other devices, either from storage or from current behavior, for analysis and/or comparison purposes. This can allow a diagnostic method to obtain a base-line for faulty and/or normal behavior in cases where no such base-line is available.

In an exemplary embodiment of the invention, the log analysis is by comparing the log (or other acquired data) of the failed device to historical values and/or default values of this or other devices.

In some embodiments of the invention, an analysis of at least some logs is entered by a human.

In an example of an automated analysis, when a log for a fault is acquired, the acquired log is compared to stored logs. A match between the log and the previously analyzed logs may be used to diagnose a fault. Further, a recommended second test or repair process may also be associated with the analyzed logs.

In an exemplary embodiment of the invention, the analysis of a log includes determining a pattern of internal device states and/or state transitions. Such a pattern may be indicative of ongoing problems, such as thrashing, or upcoming problems, such as running out of buffer space. In an exemplary embodiment of the invention, acquired logs are processed into meta-logs, in which states, parameter value changes and/or other information is filtered out, for example, to assist in later comparison of this log to other logs.

Alternatively or additionally, to analyzing internal states of the device, trend analysis and/or rule analysis are performed.

In an exemplary embodiment of the invention, a user or a vendor can define analysis rules, for example rules to discover inconsistencies in the logged or otherwise acquired data. An exemplary user defined rule includes a relationship between logged values that is expected to be maintained. Such inconsistencies may assist in diagnosing a fault and/or in predicting that a fault is likely to occur in the future.

In an exemplary embodiment of the invention, especially for mechanical devices such as a washing machine, diagnosis utilizes various sensors embedded in the device. Such sensors may be in-built, for example for use of the device programming (water temperature, water level). Alternatively or additionally, new sensors may be provided for the diagnosis, for example, external to the device. Alternatively or additionally, a human operator may apply the sensors and provide the measurement results, possibly synchronized to the time line of the log.

In an exemplary embodiment of the invention, management of the diagnosis process includes determining if the diagnosis is correct (e.g., if the repair works or the fault repeats in a predictable manner).

Repair

In an exemplary embodiment of the invention, the repair of a faulty device is achieved by providing instructions (e.g., via e-mail, telephone or a display of the device) to an operator that mechanically manipulates the device. Optionally, once the operator manipulated the device (e.g., replaced a card), the servicing network is used to reprogram the device and/or calibrate it.

Optionally, a "repair" comprises a recommendation to the user to replace the device or to enhance the network. Such a suggestion may also include a model number of a new device to purchase and/or a special offer. Optionally, the suggestion is targeted (e.g., by CRM 134) based on previous purchases and/or usage profile of the device and/or the site.

Alternatively or additionally, a software patch may be provided. In an exemplary embodiment of the invention, the patch is personalized for the device and/or device history. Optionally, the patch is selected and/or personalized (e.g., various parameters set) based on logging data from other devices where the patch was installed.

Optionally, the patch is installed while the device is operating. For example, when a section of the device code is not in use, it may be patched. Optionally, the experience with other devices is used to determine during which state vectors of the device it is safe to make a patch.

Alternatively or additionally, to patching software, a device configuration, device code and/or parts thereof may be copied between an operating device and a malfunctioning device. Optionally, service site 123 manages software updates and/or patches to the various maintained devices, so as to maintain a pool of at least one exemplary device configuration and/or programming, so that it can be copied.

In an exemplary embodiment of the invention, repair instructions (or other instructions) include a conditional script to site server 114, for example, so that site server 114 can select a particular repair based on an instantaneously logged variable in the device.

Optionally, the repair includes switching the device to use a redundant hardware or software sub-component.

It should be noted that unlike a mere software update process (e.g., as found in automatically updating software), in a maintenance process, it is not clear, ahead of time, what maintenance-related instructions will be provided. Fr example, a maintenance process may include a test instruction prior to deciding what and if to update. In addition, some types of maintenance are fault directed, in view of an existing or an anticipated fault. In addition, in an exemplary embodiment of the invention, maintenance instructions are generated per device.

Exemplary Maintenance Process

In an exemplary maintenance process (based on FIG. 1), in accordance with some embodiments of the invention, device 102 generates an alert that a possible fault condition occurred. The alert is received by site server 114 and forwarded to servicing server 124 at servicing site 123. Server 124 opens a "fault record", including a link to data logged by device 102 and selects an initial diagnosis process. The link may include, for example a file name stored at site server 114 and/or a time stamp. Server 124 uses AI server 132 to analyze the data and generate a list of possible fault states, optionally including additional recommended test. Based on the contents of the list, server 124 selects further tests to be applied. Possibly, an iterative process of acquiring data (possibly directly to AI server 132), optionally applying a test and then analyzing the data to select new data to be analyzed, is performed. Alternatively, a pre-existing diagnosis process may be tailored, for example, changing the settings of one or more tests and/or selecting which tests to omit (or add) based, for example, on cost or probability (of the tests identifying the fault).

Once the fault is diagnosed, server 124 (or AI server 132) selects a list of possible repair procedures, for example, alternative patches or configuration changes for device 102. Possibly, server 124 tests a plurality of repair procedures to determine which one is best. For example, a repair may be applied, a test performed and then the repair undone. Comparing the test results may assist in selecting the final repair method selected. Optionally, one or more long-term checkups are also performed, for example, to see if the repair took and/or was useful in the long run.

Optimization of Maintenance

In an exemplary embodiment of the invention, goals may be provided to the maintenance process as a whole. For example, one goal might be to reduce down-time due to faults and/or diagnosis. Another goal might be to reduce preventive maintenance costs. Another goal might be to reduce the availability of expenditures.

Optionally, when maintenance is performed and/or scheduled to be performed, the goals are considered when setting various parameters (e.g., frequency of testing) and/or selecting between possible repairs.

In some embodiments of the invention, device failure statistics will be available, at least after a time. In an exemplary embodiment of the invention, these failure statistics are used to optimize the maintenance performance and/or planning, for example, using well known optimization methods, in order to meet the above goals.

Additional Functions

Configuration 100 maybe used for non-maintenance activities as well. In one example, configuration 100 is used to acquire usage statistics, for example for aiding the manufacturer in determining if the devices he sells are used as planned.

Alternatively or additionally, configuration 100 is used for providing and installing software updates. Such updates may be provided to a device, for example, in response to a statistic (e.g., average) of failures.

Alternatively or additionally, configuration 100 is used for device configuration management (e.g., via site server 114 and/or servicing server 124). In an exemplary embodiment of the invention, device updates are selected in view of previous patches and/or fault conditions experienced by the devices. Thus, some devices may not be updated, or some features not updated, to avoid a future fault state.

Alternatively or additionally, configuration 100 is used in conjunction with help desks, for example, allowing a help desk operator to determine that an instruction he gave was correctly performed.

Alternatively or additionally, configuration 100 is used for debugging the operation of devices that affect other devices, for example, load distribution servers and other devices that execute resource allocation protocols. In such devices, failure may be caused by an unsuitable distribution, rather than by real trouble with a device. Typically, the device causing the problem is not the device that has a failure. Such linked failure may also be caused by failure of the causing device to properly execute its tasks (e.g., a "real" failure). In an exemplary embodiment of the invention, such linked failures are analyzed by linked logging or data collection form a plurality of devices. The logging may be linked, for example, by a central server (e.g., site server 114) or by messages between the devices (or agents thereof).

Possibly, however, the privacy methods described above still apply (for the various non-maintenance activities above), so that the help desk is not aware, for example, of the location of the device and/or the data entered into the device. Instead, the agent may provide only an indication of the command performed and its execution result (e.g., fail/success).

Exemplary Processes

Figures 5, 6:
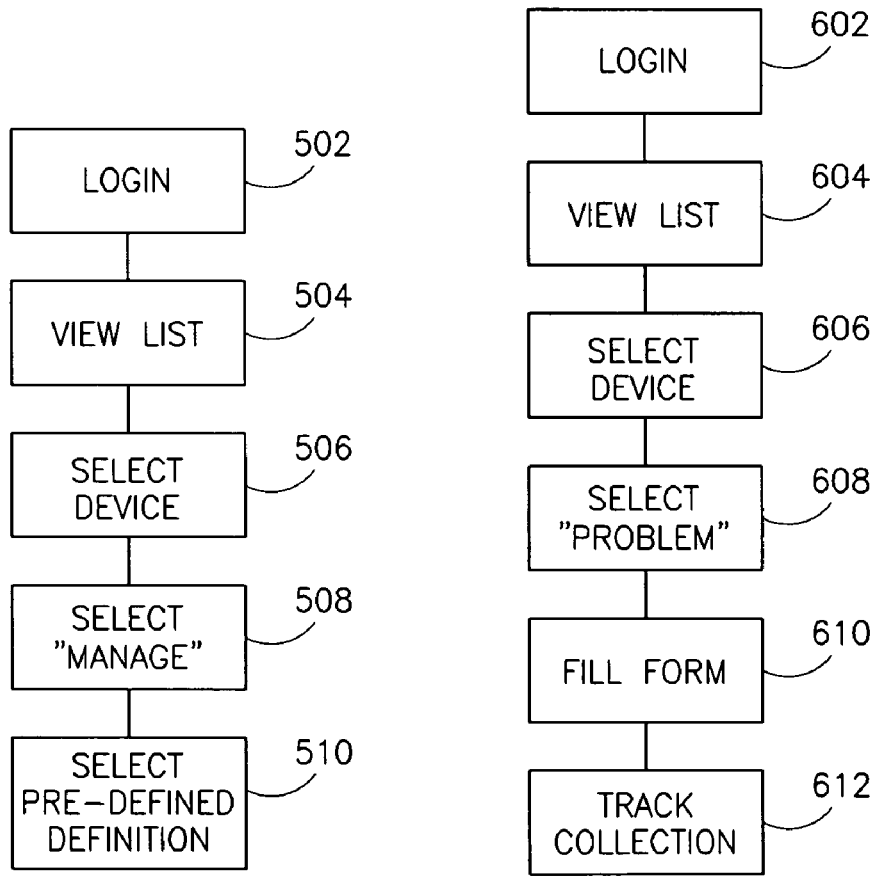
FIG. 5 is a flowchart of a method for setting up data logging, in accordance with an exemplary embodiment of the invention.
FIG. 6 is a flowchart of a method for reporting a problem, in accordance with an exemplary embodiment of the invention.

FIG. 5 is a flowchart 500 of a method for setting up data logging, in accordance with an exemplary embodiment of the invention. At 502, a user of user site 101 logs into site server 114 as a local user. At 504, the user views a list of devices. At 506, the user selects a device to manage and at 508, the user selects the manage function. At 510, the user selects a predefined logging profile to act out. Such a logging profile can be infinite or it can be limited (e.g., time or data limited). A user can define a new logging profile or change an existing profile, for example, for repeated or long term use or for a one time use. A similar process is optionally used to stop logging and/or to requests that a log file be stored, deleted and/or forwarded to a different location.

FIG. 6 is a flowchart 600 of a method for reporting a problem, in accordance with an exemplary embodiment of the invention. At 602, the user logs in. At 604 and 606 the user selects a device to report a fault on. In some cases, the device will pop up (or will be in a special list) when the user logs in, for example, if the device initiated a fault report and/or if site server 114 or a different component detected or suspects a fault. At 608, the user selects that he desires to fill out a problem report form, to be filled out at 610. In an exemplary embodiment of the invention, some of the fields will be pre-filled and, optionally, unchangeable. Alternatively or additionally, site server 114 will suggest fill-in data or provide it, for example, logged data. At 612, a new data collection task (e.g., logging or another method) is generated and carried out as result of the report. Possibly, the user tracks the logging and/or the analysis of the logging. Alternatively or additionally, the problem report is sent to a different component of configuration 100. In an exemplary embodiment of the invention, such a problem report is used to prompt long term logging and log analysis of this and/or other devices.

When a device is removed, the various components of configuration 100 are optionally informed. In some implementations, only site server 114 will be aware of the device's existence. A similar process may be applied when a new device is provided.

When a new device is provided in replacement for an old device, the old device operational logs may be associated with the new device as well, for example, so that a comparison can determine if faults of the previous device were caused by the device or its use or its environment.

In an exemplary embodiment of the invention, when a new device is provided and/or a new type of device is provided at a site, the site may download information about the specific device and/or device type from servicing site 123. Alternatively or additionally, a process of Darwinian learning may be initiated, for example, to determine at which device states it is permissible to patch the device software and/or activate various hooks in the agent.

Automation Level

Different implementations will utilize different automation levels or a mixture of automation levels. For example, the maintenance may be completely automatic, possibly basing changes in maintenance schedule on an analysis of data from a test of the effect of changing such a schedule. Alternatively, some human interaction may be allowed, for example, a human may be require to mediate for some devices. Alternatively or additionally, a human may assist in complex analysis and/or in devising repair. Alternatively or additionally, a human approval may be required for carrying out some repairs. Optionally, even if an automatic action is performed, a human is informed of the action.

The automation level may varied also for safety reasons, for example, automated diagnosis may be allowed for medical installations, but not automated repair. Statistics on the quality of the repair work that are collected by configuration 100 may be used to determine which types of activities may be manual and which may be automatic.

Billing

Various charging schemes maybe used to receive payment for the use of the expertise in the various support stations. First, the various software and/or hardware components may be sold and/or licensed. Alternatively or additionally, requests to servicing server may be billed to a user account, for example, based on IP, hostname and device ID. Other charging schemes for services, as well known in the art may be used, for example, base on length of stored logs and/or other quotas. However, in many situations the user site will not want to report the site specific configuration. In such a case, site server 114 (or communication server 120) may strip identifying information from the request. The billing may then be on a request basis and/or on a response time basis.

In some exemplary embodiments, a user site is provided with reductions in cost for service, for example, if the user site allows information gleaned from maintenance at the site to be shared and/or if the site may be used for testing.

Alternatively or additionally, the billing may be locally managed via site server 114, which server reports the billing charges to a remote computer, for charging purposes.

Exemplary Applications

The above servicing network has been described in general and with some reference to particular applications. It should be appreciated that such a network may be applied to all types of embedded devices that can connect to a communication medium of any type, including, for example, public (e.g., Internet) and private computer and data networks, telephone networks and wireless networks.

In one example, the supported device is a cellular network, including the fixed components and/or the mobile components. Alternatively or additionally, the devices are components of a telephone routing network.

In another example, the devices are components of a computer network (e.g., computers, routers, hubs, printers and/or storage devices). It should be appreciated that various parts of configuration 100 (e.g., the agents and the communication protocol) may be embedded in operating systems and/or hardware of the maintained devices. Possibly, at least some of the devices are "pure" software devices, for example, application programs.

Another example is home automation, alluded to above, where site server 114 may be a central house automation computer and the devices that are being maintained (including reminders for personal maintenance) are various appliances and/or the house itself.

Another example is Java machines, for example cellular telephones and home appliances, to which a suitable agent may be downloaded via communications network.

An example of devices that need to be protected from outside influence and/or may require privacy protection are medical and industrial workshop networks.

It will be appreciated that the above-described methods of maintaining and supporting devices may be varied in many ways. In addition, a multiplicity of various features, both of methods and of devices has been described. Where methods are described, devices for carrying out the methods are also contemplated. It should be appreciated that different features may be combined in different ways. In particular, not all the features shown above in a particular embodiment are necessary in every similar exemplary embodiment of the invention. Further, combinations of the above features from different exemplary embodiments are also considered to be within the scope of some exemplary embodiments of the invention, for example, triggering methods form one type of maintenance may be used in a different type of maintenance. Where processes are shown, the order of steps may be varied and/or steps combined or split. Where devices are shown, the division of functions between components may be varied and/or components combined or split. Also within the scope of the invention are devices and/or software for programming existing devices to make the device comply with the methods described herein. Section headings where they appear are meant for clarity of browsing only and should not be construed as limiting the contents of a section to that particular section. When used in the following claims, the terms "comprises", "includes", "have" and their conjugates mean "including but not limited to".

It will be appreciated by a person skilled in the art that the present invention is not limited by what has thus far been described. Rather, the scope of the present invention is limited only by the following claims.

The invention claimed is:

1. A method of device maintenance, comprising:
providing a maintenance network including a user site and a multi-device servicing site that provides maintenance to at least one target device in said user site;
selecting, by a user, a degree of access prevention of maintenance functions, including intermediate restriction levels of said servicing site to at least one of maintenance-related information of said target device and commanding said target device to perform a maintenance-related task;
setting said degree of access; and
performing at least one of said maintenance functions to said target device;
displaying a report of said maintenance functions in a manner that indicates problems in the target devices,
wherein said degree of access prevention includes intermediate restriction levels.

2. A method according to claim 1, wherein said setting comprises setting at said target device.

3. A method according to claim 1, wherein said setting comprises setting at a site server associated with a plurality of devices located at a same site as said target device.

4. A method according to claim 1, wherein said setting comprises setting at a communication server that mediates communication between said user site and servicing site.

5. A method according to claim 1, comprising enforcing conformance with said degree of access by an entity associated with said user site.

6. A method according to claim 5, wherein said entity comprises a site server associated with a plurality of devices located at a same site as said target device.

7. A method according to claim 5, wherein said entity comprises a dedicated agent associated with said target device.

8. A method according to claim 5, wherein said enforcing comprises blocking data arriving from said target device.

9. A method according to claim 5, wherein said enforcing comprises blocking tasks sent to said target device.

10. A method according to claim 5, wherein said enforcing comprises faking device data.

11. A method according to claim 1, wherein said provided maintenance comprises automated maintenance.

12. A method according to claim 1, wherein said provided maintenance comprises manual maintenance.

13. A method according to claim 1, wherein said maintenance network comprises an on-line network.

14. A method according to claim 1, wherein said maintenance network comprises an off-line network.

15. A method according to claim 1, wherein said degree of access comprises allowing said servicing site to view maintenance-related information from said target device.

16. A method according to claim 1, wherein said degree of access comprises allowing said servicing site to set parameters in said target device.

17. A method according to claim 1, wherein said degree of access comprises allowing said servicing site to access a maintenance protocol supported by said target device.

18. A method according to claim 1, wherein said target device comprises a home appliance.

19. A method according to claim 1, wherein said target device comprises a telecommunication network device.

20. A method according to claim 1, wherein said maintenance-related task comprises an instruction to patch software on said target device.

21. A method according to claim 1, wherein said maintenance-related task comprises at least one diagnosis rule.

22. A method according to claim 1, wherein said maintenance-related task comprises an instruction to collect information on said target device.

23. A method according to claim 1, wherein said maintenance comprises preventive maintenance.

24. A method according to claim 1, wherein said maintenance comprises diagnosing a fault condition.

25. A method according to claim 1, wherein said maintenance comprises repairing a fault condition.

26. A maintenance configuration adapted for carrying out the method of claim 1, comprising:
at least one target device at a user site;
at least one site server associated with a plurality of devices at said user site; and
a maintenance server that provides maintenance for said target device.

27. A method of device maintenance, comprising:
(a) detecting a fault in a target device;
(b) automatically determining that remote access to said target device is needed;
(c) automatically allowing a change in degree of remote access prevention of a remote access channel, said degree of access prevention including intermediate restriction levels; and
(d) remotely accessing and maintaining said target device via said channel in response to said detected fault.

28. A method according to claim 27, wherein said (a) is performed by a user of the target device.

29. A method according to claim 27, wherein said (a) is performed automatically.

30. A method according to claim 27, wherein said remote access is within a same network.

31. A method according to claim 27, wherein said remote access is via a firewall hat protects the device.

32. A method according to claim 27, wherein said remote access is via terminal emulation.

33. A method according to claim 27, wherein said remote access is via desktop sharing.

34. A method according to claim 27, wherein said remote access enables retrieval of files from said target device.

35. A method according to claim 27, wherein said remote access enables writing of files to said target device.

36. A method according to claim 27, wherein said change in degree comprises changing based on predefined policies.

37. A method according to claim 27, wherein said change in degree comprises allowing a specific user to connect.

38. A method according to claim 27, wherein said change in degree comprises allowing a specific protocol to connect.

39. A method according to claim 27, wherein said change in degree comprises allowing said channel to be opened for a specific amount of time.

40. A method according to claim 27, wherein said change in degree comprises allowing the connection of said target device to other devices related to said fault.

41. A method according to claim 27, wherein said change in degree comprises blocking specific commands.

42. A method according to claim 27, wherein said change in degree comprises filtering specific responses from said target device.

43. A method according to claim 27, wherein session logs of said remotely accessing are stored locally on said target device.

44. A method according to claim 27, wherein session logs of said remotely accessing are remotely accessible from said target device via said channel.

45. A method according to claim 27, wherein the user of the target device is informed when said target device is remotely accessed via said channel.

46. A method of device maintenance, comprising:
providing a maintenance network including a user site and a multi-device servicing site that provides maintenance to at least one target device in said user site;
selecting, by a user, a degree of access prevention of maintenance functions of said servicing site to at least one of maintenance-related information of said target device and commanding said target device to perform a maintenance-related task;
setting said degree of access; and
performing, by the servicing site, at least one of said maintenance functions to said at least one target device in said user site,
wherein said degree of access prevention includes intermediate restriction levels.

47. A method according to claim 46, further comprising:
determining the status of failure states in said at least one target device; and
and wherein said performing comprises performing, by the servicing site, at least one of said maintenance functions to said at least one target device in said user site, in response a to said determined status of failure states.

48. A method of device maintenance, comprising:
(a) detecting a fault in a target device;
(b) automatically determining that remote access to said target device is needed;
(c) automatically allowing a change in degree of remote access prevention of a remote access channel, said degree of access prevention including intermediate restriction levels; and
(d) remotely accessing and maintaining said target device via said channel
(e) displaying a report of said maintaining of said target device in a manner that indicates problems in the target device.

* * * * *